US005845410A

United States Patent [19]

Boker

[11] Patent Number: 5,845,410

[45] Date of Patent: Dec. 8, 1998

[54] MITER DEVICE AND METHOD

[76] Inventor: Donald W. Boker, 15740 Valley View Rd., Fayetteville, Ark. 72704

[21] Appl. No.: 695,291

[22] Filed: Aug. 8, 1996

[51] Int. Cl.[6] .......... C01B 3/56

[52] U.S. Cl. .......... 33/536; 33/469; 83/421

[58] Field of Search .......... 33/465, 468, 469, 33/471, 536, 534; 83/421, 477.2, 522.25

[56] References Cited

U.S. PATENT DOCUMENTS

| | | | |
|---|---|---|---|
| D. 89,818 | 5/1933 | Tautz . | |
| 808,889 | 1/1906 | Von Culin | 83/109 |
| 817,991 | 4/1906 | Ross | 33/469 |
| 1,894,010 | 1/1933 | Tautz . | |
| 1,902,270 | 3/1933 | Tate | 33/468 |
| 1,985,614 | 12/1934 | Merrigan | 33/500 |
| 2,548,350 | 4/1951 | Combs | 33/469 |
| 2,594,574 | 4/1952 | Marsden | 33/471 |
| 2,645,026 | 7/1953 | Trbojevich | 33/536 |
| 2,735,182 | 2/1956 | Kalberer | 33/534 |
| 4,454,793 | 6/1984 | Strong | 83/421 |
| 4,514,909 | 5/1985 | Gilbert | 33/471 |
| 5,038,486 | 8/1991 | Ducate, Sr. | 33/430 |
| 5,379,669 | 1/1995 | Roedig | 83/421 |
| 5,402,701 | 4/1995 | Ingram | 83/421 |

OTHER PUBLICATIONS

Table Saw Necessities, McFeely's Square Drive Screws and More, 1995, #95D, p. 50.

Saw Set–Up Accessories, McFeely's Square Drive Screws and More, 1995, #95C, p. 45.

*Primary Examiner*—Thomas B. Will

*Attorney, Agent, or Firm*—Head, Johnson & Kachigian

[57] ABSTRACT

A very accurate, multiple position, miter device or gauge for use with a table saw or the like includes a protractor having a plurality of equally spaced precision drilled step-holes, a sine bar, a micrometer adjust, and a guide bar adapted to fit within a guide groove or miter slot. In accordance with a particular example, the device includes a protractor having thirteen equally spaced, angled step-holes precisely spaced at 15° from one another. The micrometer adjust includes a thimble screw having 1/6020 (one minute) increments with one full revolution of the thimble screw adjusting the angle of the sine bar by 1/40 (15 minutes). Also, the guide bar includes 0°, 3 ¾° and 7 ½° offset threaded openings for receiving an angle hole lock shoulder bolt which passes through the protractor and into the guide bar. Hence, the miter device can be set at selected precise 15°, 7 ½° and 3 ¾° increments using the angle step-holes, the 0°, 3 ¾° or 7 ½° offset openings, and the angle hole lock shoulder bolt. Angles between the selected 15°, 7 ½°, and 3 ¾° increments are set precisely using the angle step-holes and offset openings together with the thimble screw. Once placed in the desired position, the sine bar is locked into position by a locking screw.

20 Claims, 6 Drawing Sheets

MITER DEVICE AND METHOD

BACKGROUND OF THE INVENTION

The present invention relates to miter gauges, miter gauge components, protractors, sine bars and the like for use with table saws, radial arm saws, chop saws, and other power tools or equipment, and more particularly concerns an improved miter gauge or device including a protractor having a plurality of angle step-holes along a rearward surface and a sine bar attached to a forward surface thereof for making precision cuts.

Miter gauges or devices are well known in the metal and woodworking arts for use with table saws, jigsaws, band saws, and the like for setting the miter angle between a work piece being machined or cut and the cutting line of the saw blade. Typically the miter gauge includes a protractor attached to a guide bar which is received in a linear groove machined into the flat surface of the tool parallel to the saw blade.

Further, conventional miter gauges include an arcuate slot with an arc of about 90° to 120° and receiving therethrough the shaft of a vertical handle or clamping member which engages the guide bar and protractor to lock the miter gauge at a selected miter angle. If the miter gauge does not include one or more pin set points, it is difficult to establish a selected miter angle with much accuracy. Although the protractor may include one degree angle markings, when the vertical handle or clamp member is tightened down upon the protractor to lock the miter gauge at a selected miter angle, the rotation of the handle or clamp causes the protractor to move slightly and not be set exactly at the chosen angle.

Since most conventional miter gauges leave much to be desired when it comes to accuracy, those desiring to make precision cuts are required to buy accessories such as a cut-off box, a precision triangle or use the cut and try method wasting numerous work pieces in an attempt to cut the material at a selected miter angle. With the exception of a limited number of pinned set points (90, 45, 30, 22 ½, 15, 0 degrees), miter gauges currently available for table saws produce angles between the set points which are at best an approximation to the angle desired. One manufacturer recommends fine tuning in increments of 0.025° through the use of plastic shims. This does not solve the problem, for example, of setting an angle of 36° (for a 5-sided frame) as this angle is not pinned and the user must rely on his ability to see and lock the miter gauge at a selected one° increment on the outside edge of the protractor. Hence, they must cut and try until the angle cut conforms with the angle desired. The angle associated with a 6-inch to 12-inch roof pitch, 26 degrees 34 minutes is another example of a miter angle which causes the user to cut and try.

Miter gauges are described for example in U.S. Pat. Nos. 1,902,270, 4,514,909, 5,038,486, and 5,379,669. Miter gauge accessories or apparatus are described also in U.S. Pat. Nos. 1,894,010, 4,454,793, and 5,402,701.

U.S. Pat. No. 5,379,669 discloses a precision miter gauge having a sine-plate assembly mounted on a guide bar. The sine-plate assembly includes a stationary plate, a hinge plate pivotally connected to the stationary plate, and a plurality of gauge blocks adapted to produce exact pre-determined angles when positioned between the stationary plate and a reference pin pivotally coupled to the hinge plate. This device suffers from the drawbacks of requiring the use of a particular gauge block or blocks for each selected miter angle and the removal and replacement of gauge blocks to change the angle.

Hence, there exists a need for an improved miter gauge or device and method for making precision cuts at selected miter angles, which is easy to use, and which can readily be changed from one selected miter angle to another.

SUMMARY OF THE INVENTION

The improved miter device and method of at least one embodiment of the present invention addresses the problems and drawbacks of conventional miter gauges by making it possible to set any angle from 0° to 90° to an accuracy of one minute or better. Protractor accuracy is obtained by using pinned or step-holes available every 15° and offsets of 0°, 7 ½°, or 3 ¾° for accuracy of set points. A sine bar is used to set any angle between the set points. To avoid having to use tables, a linear function may be selected to replace the trigonometric sine function over this range. Through the use of a graduated micrometer, thumb or thimble screw, the sine bar may be advanced in one minute increments over the 3 ¾° or 7 ½° range. The error introduced by using a linear function over this small range is less than one minute (maximum theoretical error 19.55 seconds at 7 ½° and less than 2 seconds at 3 ¾°). This very small error is possible because of the limited range, in degrees, of the trigonometric (sine) function.

In accordance with an exemplary embodiment of the present invention, there is provided a very accurate, multiple position, miter device or gauge for use with a table saw or the like. The device includes a protractor having a plurality of equally spaced precision drilled step-holes, a sine bar, a micrometer adjust, and a guide bar adapted to fit within a guide groove or miter slot. In accordance with a particular example, the device includes a protractor having thirteen equally spaced, angled step-holes precisely spaced at 15° from one another (on center). The micrometer adjust includes a thimble screw having 1/60° (one minute) increments with one full revolution of the thimble screw adjusting the angle of the sine bar by ¼° (15 minutes). Also, the guide bar includes 0°, 3 ¾° and 7 ½° offset threaded openings for receiving an angle hole lock shoulder bolt which passes through one of the step-holes of the protractor and into the guide bar. Hence, the miter device can be set at selected precise 15°, 7 ½° and 3 ¾° increments using the angle step-holes, the 0°, 3 ¾° or 7 ½° offset openings, and the angle hole lock shoulder bolt. Angles that can not be set with the angle step-holes or offset openings, for example, 11.25 clockwise, 3.75 counterclockwise, or the angles between the 3 ¾° increments are set using the thimble screw. Once placed in the desired position, the sine bar is locked into position by a locking screw.

In accordance with another embodiment of the present invention, a protractor and sine bar unit including a protractor having a plurality of evenly spaced precision drilled step-holes, a sine bar, and a micrometer adjust is adapted for use with a planar surface which includes a pivot point opening and one or more degree offset openings, for example 0°, 3 ¾° and 7 ½° offsets. This precision protractor unit may be used for example with a drill press or numerically controlled machine for cutting, stamping, drilling or otherwise treating a work piece in a particular position or along a particular angle.

The accuracy of placement, location, and miter angle of the work piece or the cut, hole or the like therein is determined in part by the precision machining of the sine bar, protractor head, pivot point hole, angle step-holes, the number of step-holes, and the number of offset openings for locking the protractor in a selected position.

The principle object of the present invention is the provision of an improved miter device including a protractor having a plurality of precision angle step-holes.

Another object of the present invention is the provision of an improved miter device including a protractor having a plurality of precision angle step-holes and a sine bar attached to the protractor for adjusting the angle of cut between the angles of the step-holes.

A still further object of the present invention is the provision of an improved miter device including a protractor having a plurality of precision angle step-holes, a sine bar attached to the protractor for adjusting the angle of cut between the angles of the step-holes, and an elongate guide bar adapted to be attached to the protractor and including one or more offset openings.

Yet another object of the present invention is the provision of a method for forming precision cuts, holes or the like in a work piece using a miter apparatus including a protractor having a plurality of precision angle step-holes.

Other objects and further scope of the applicability of the present invention will become apparent from the detailed description to follow taken in conjunction with accompanying drawings wherein like parts are designated by like reference numerals.

DETAILED DESCRIPTION OF THE PREFERRED EMBODIMENTS

Figure 1:
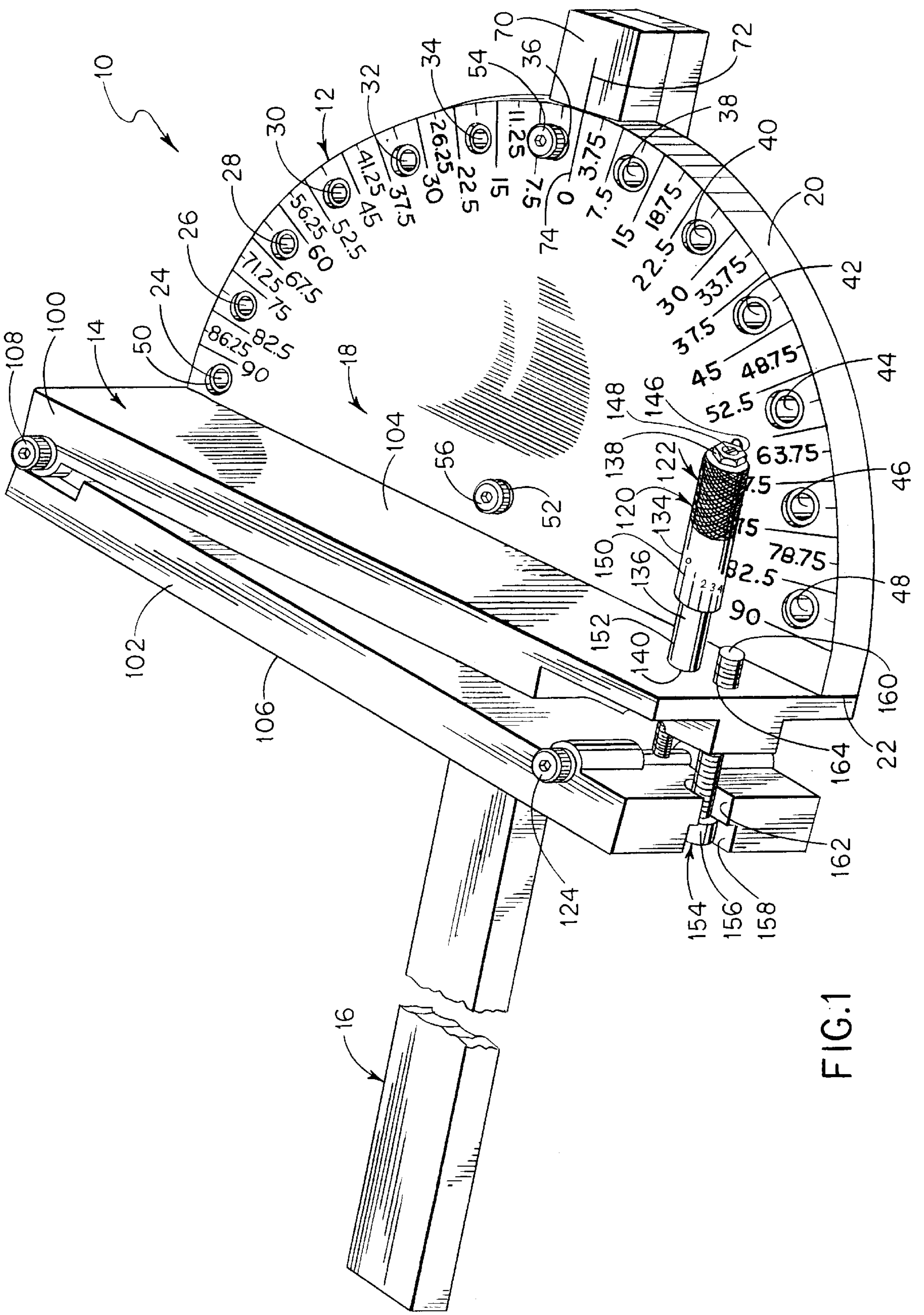
FIG. 1 is a perspective view illustration of an improved miter device in accordance with an exemplary embodiment of the present invention.

In accordance with the exemplary embodiment of the present invention as shown in FIGS. 1–6 of the drawings, an improved miter device or miter gauge is generally designated by the reference numeral 10 and shown to include as major components, a protractor 12, a sine bar 14, and a guide bar 16. The protractor 12 includes a head 18 having a curved rearward surface 20 subtending an arc of about 180°, a planar forward surface 22 adapted to receive the sine bar 14, to serve as a planar working surface, or adapted to receive a fence or other work guiding or holding element. Further, the head 18 includes a plurality of precision drilled angle step-holes 24–48 (pin holes) spaced apart at equal angle increments along the curved rearward surface 20. Each of the angle step-holes 24–48 is a substantially vertical circular opening running substantially parallel to the curved surface 20 and having an enlarged circular recess 50 at its upper end for receiving the head of a shoulder bolt.

Further, the head 18 of protractor 12 includes a pivot point hole 52 located at the center of the arc of the rearward surface 20 with the axis of hole 52 corresponding to the axis of rotation of the curved rearward surface 20 and for the arc of the angle step-holes 24–48.

The protractor 12 further includes position or miter angle locking elements in the form of first and second shoulder bolts 54 and 56. Each of shoulder bolts 54 and 56 are of like construction and include respectively a large diameter head 58 and 60, an intermediate diameter shaft 62 and 64, and a small diameter threaded end 66 and 68. The cylindrical shaft 62 and 64 of each of the shoulder bolts 54 and 56 is dimensioned to fit snugly within each of the respective openings 24–48 and 52. The heads 58 and 60 of each of the shoulder bolts 54 and 56 are dimensioned so as to be at least partially received within each of the recesses 50. The shaft 64 of shoulder bolt 56 serves as the rotational pivot shaft for the protractor 12. The shoulder bolt 54 serves as the position setting or locking element with respect to one of the angle step-holes and one of the offset openings in the guide bar as will be described in greater detail below.

Lastly, the protractor 12 includes a guide block 70 attached to the guide bar 16 adjacent to the curved rearward surface 20 and having a center mark or base line 72 for facilitating positioning of the protractor head 18 at a selected one of angle markings 74.

Figure 2:
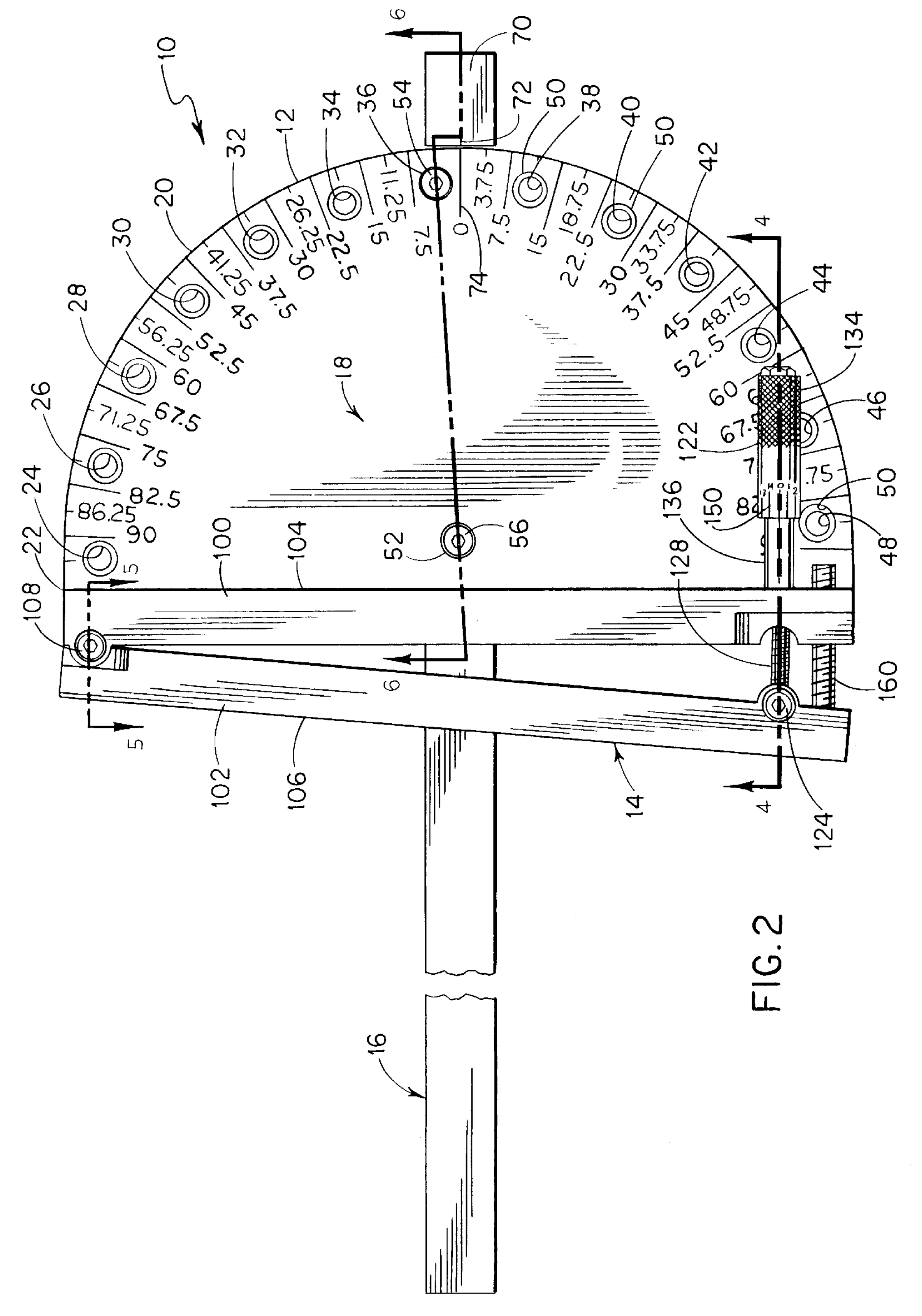
FIG. 2 is a top view representation of the miter device of FIG. 1.
Figure 3:
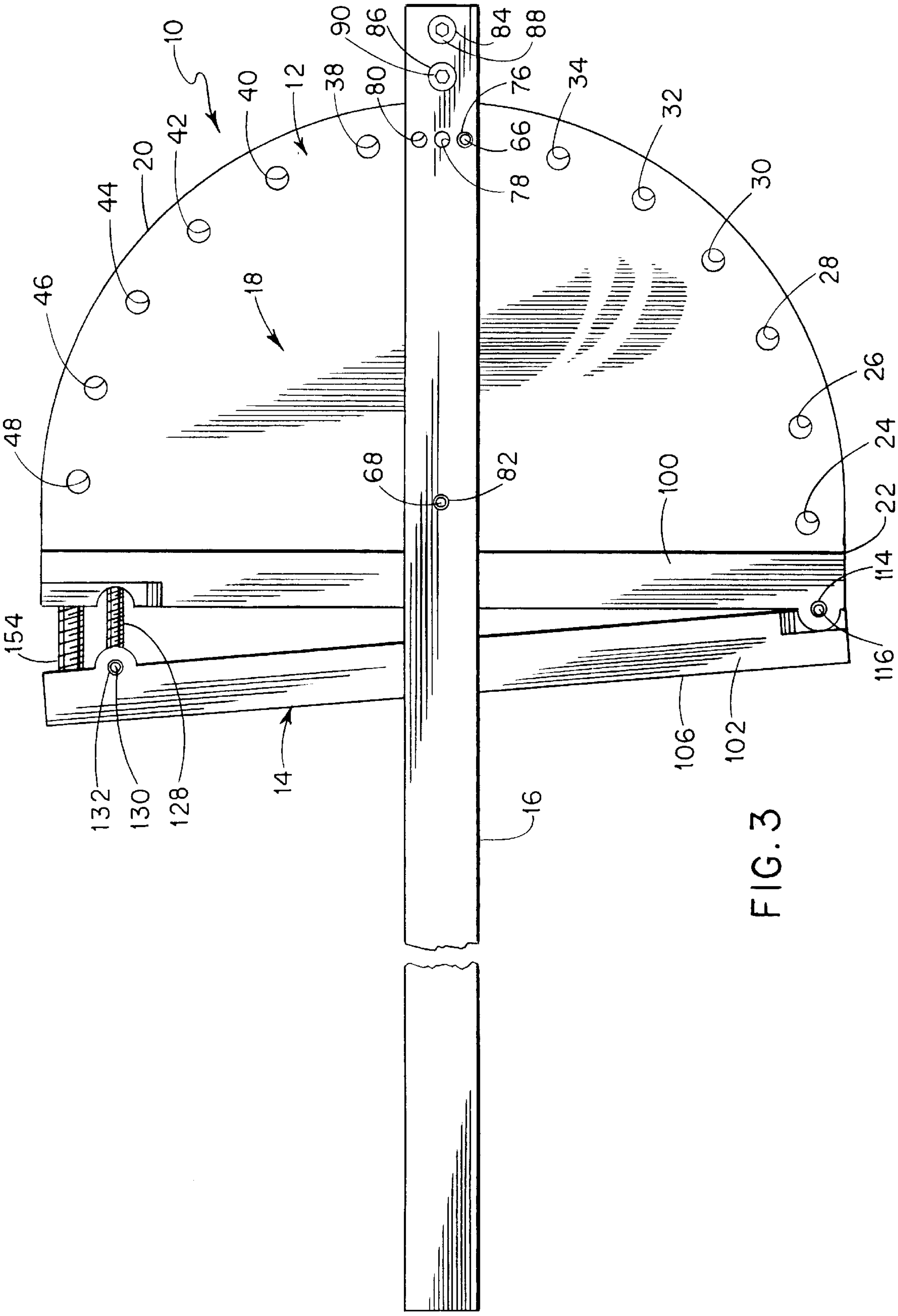
FIG. 3 is a bottom view illustration of the miter device of FIG. 1.
Figure 5:
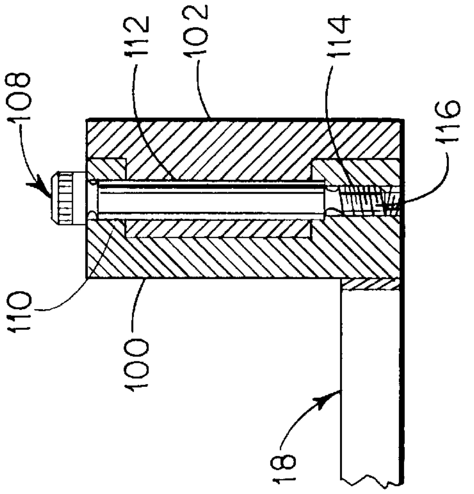
FIG. 5 is a partial cross-section illustration taken along line 5—5 in FIG. 2.
Figure 4:
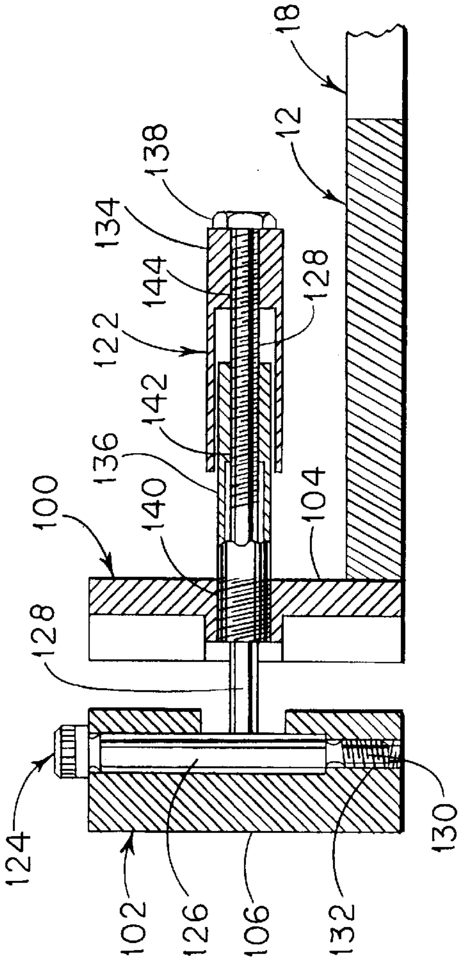
FIG. 4 is a partial cross-section representation taken along line 4—4 in FIG. 2.
Figure 6:
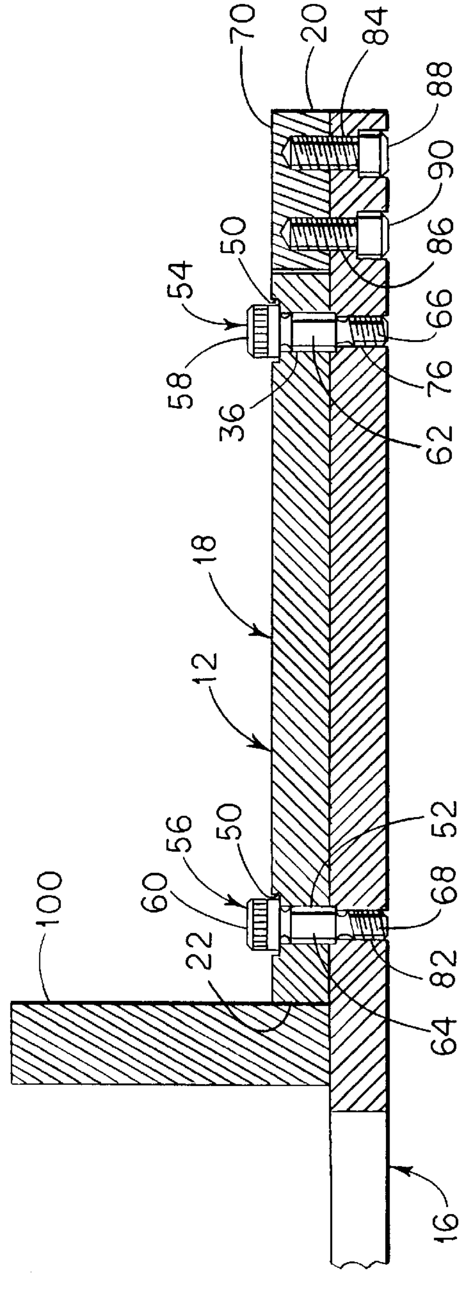
FIG. 6 is a partial cross-section representation taken along line 6—6 in FIG. 2.

With reference to FIGS. 1–3 of the drawings, the protractor is positioned at the 0° angle position with the planar surface 22 of head 18 substantially perpendicular to the guide bar 16. In this position, the shoulder bolt 54 is received within angle step-hole 36 and in a 0° offset opening 76 of guide bar 16. With reference to FIGS. 1–4 of the drawings, the sine bar 14 is shown slightly open in a position greater than 0° but less than 7 ½°.

In accordance with the exemplary embodiment shown in FIGS. 1–6 of the drawings, the angle step-holes 24–48 are spaced apart at 15° angle increments with a short angle mark or line adjacent the curved surface 20 to indicate the center of each of the angle step-holes. Adjacent each of the angle step-holes is a long angle mark or line indicating the 7 ½° angle increments. Between respective pairs of the 7 ½° angle marks or lines are short angle marks or lines indicating the 3 ¾° increments. Each of these angle marks or lines 74 is used in combination with the center mark or base line 72 and lock bolt 54 to provide a quick and easy method of precision miter angle positioning of the protractor relative to the guide bar. The angle lines or marks 74 provide selected precision angle positions of protractor head 18 relative to guide bar 16.

Although the exemplary embodiment uses angle step-holes at 15° increments, it is to be understood that larger increments such as 30° or smaller increments such as 5° or 10° may be used depending on the size of the protractor head, the size of the angle step-holes, and the desired precision. For example, the number of angle step-holes can be doubled by adding an additional angle step-hole between each of the 7 ½° marks and centered on the 3 ¾° short marks (at 11.25, 26.25, 41.25, etc., clockwise and 3.75, 18.75, 33.75, etc., counterclockwise). If these additional angle step-holes are added, then the 7 ½° offset opening in the guide bar can be eliminated.

Guide bar 16 is an elongate rectangular rod or bar adapted to fit within a rectangular slot or recess in a working surface of a saw or other work table or support surface. Guide bar 16 includes three offset openings 76, 78 and 80, the first offset opening 76 being a 0° offset opening, the second opening 78 being a 3 ¾° offset opening, and the third opening 80 being a 7 ½° offset opening. Further, guide bar 16 includes a pivot point opening 82 and openings 84 and 86 for receiving set screws 88 and 90 for attaching guide block 70 to guide bar 16. Each of the offset openings 76, 78 and 80 and the pivot point opening 82 is threaded and adapted to receive the threaded ends 66 and 68 of shoulder bolts 54 and 56. As shown in FIGS. 1–3 and 6 of the drawings, each of the shoulder bolts 54 and 56 is completely received in the respective openings 36 and 52 of head 18 and 76 and 82 of guide bar 16. Thus, the protractor is locked into the 0° position with forward planar surface 22 of head 18 transverse to the length of guide bar 16.

In order to locate the protractor at a different angular position with respect to the guide bar, one merely loosens the pivot point shoulder bolt 56 sufficiently to allow rotation of the head 18 relative to guide bar 16 and removes shoulder bolt 54 from the 0° offset opening 76 and the angle step-hole 36. With the shoulder bolt 56 loosened and bolt 54 removed from the angle step-hole, the protractor head can be rotated in position with the selected angle degree line or mark, for example the 37.5° opposite the center mark or base line 72 of guide block 70. Next, the shoulder bolt 54 is placed into angle step-hole 32 and the end 66 is threaded into the 7 ½° offset opening 80. To lock the protractor in this position one merely tightens shoulder bolts 54 and 56.

Since the threaded end 66 of shoulder bolt 54 must be received within one of the offset openings 76, 78 and 80 of guide bar 16 and the angle degree marks or lines 74 are spaced apart at 3 ¾° increments, it is nearly impossible to erroneously position the protractor with respect to a selected angle degree mark.

In accordance with another example of the present invention, the 3 ¾° offset opening 78 and each of the 3 ¾° increment angle degree marks or lines and numerals between the 7 ½° marks or lines are eliminated. In accordance with yet another example of the present invention, both the 3 ¾° and 7 ½° offset openings 78 and 80, as well as the 3 ¾ and 7 ½ angle degree marks or lines are eliminated.

With reference again to FIGS. 1–6 of the drawings, the sine bar 14 includes first and second vertical plates 100 and 102 with a rearward vertical surface 104 of plate 100 being attached to the forward planar surface 22 of head 18 of protractor 12 and a forward vertical surface 106 of plate 102 serving as the working surface abutting the work piece. First and second plates 100 and 102 of sine bar 14 are hingedly joined to one another by an elongate shoulder bolt or hinge pin 108 received through respective circular openings 110, 112 and 114 of plates 100 and 102. The lower opening 114 of plate 100 is threaded to receive the corresponding threads on the lower end of hinge pin 108.

The sine bar 14 further includes an angle adjustment assembly 120 including a graduated thumb screw, thimble screw or micrometer unit 122 and an elongate shoulder bolt or hinge pin 124 having a central shaft 126 contacted by the forward end of an elongate threaded rod 128. The pin or bolt 124 has a reduced diameter lower end 130 having external threads which are received by corresponding internal threads in an opening 132 in plate 102.

The graduated thumb screw, thimble screw or micrometer unit 122 includes the elongate threaded rod 128, a thimble or cylinder 134, a sleeve 136, and a nut 138 at the rearward end of thimble 134. The forward end of sleeve 136 has external threads which are received in corresponding internal threads in an opening 140 in plate 100. The external threads of rod 128 are received in corresponding internal threads in a central opening 142 in sleeve 136, opening 144 in thimble 134, and opening 146 in nut 138. The rearward end of elongate threaded rod 128 includes a linear slot 148 which provides for zeroing or adjustment of the graduated thumb screw unit 122. The exterior of the thimble 134 includes gradation lines or marks 150 which are aligned with a center line or mark 152 on sleeve 136 to select the desired angle of cut between the angles of the angle step-holes. In accordance with the particular examples shown in FIGS. 1–6 of the drawings, the thimble 134 is graduated at 1/60° (1 minute) increments with one full revolution of the thumb screw or thimble changing the angle of the sine bar by ¼° (15 minutes).

Still further, the sine bar 14 includes a locking screw 154 having a head 156 located in a recess 158 in plate 102 and an elongate threaded shaft 160 passing through a recess 162 and threadably received in an internally threaded circular opening 164 in plate 100. Once the selected angle has been reached by rotating the thimble 134, the sine bar is locked into position by tightening the locking screw head 156 against the shoulder of plate 102 between recesses 158 and 162.

Although it is preferred to attach the plate 100 of sine bar 14 to the head 18 of protractor 12 by a plurality of threaded fasteners passing through plate 100 and into head 18, it is contemplated that one could machine or mold the plate 100 and head 18 as a single integral unitary item.

In accordance with a particular example of the present invention, the protractor head is formed of ⅜° inch thick aluminum plate with the angle step-holes having a diameter of about ¼° of an inch, a radius between the pivot point and the curved rearward surface 20 of about 4.125 inches, an overall length of planar forward surface 22 of about 8.25 inches, and the curved rearward surface 20 sustaining an arc of greater than 180° but with planar flat sides of ½° inch in length adjacent the planar forward surface 22. Although it is preferred to form the protractor and sine bar of a lightweight sturdy metal material such as aluminum, it is to be understood that other materials such as stainless steel, polycarbonate plastics, metal alloys, composite resin materials, or the like may be used depending on the necessary weight, strength and durability requirements.

Also in accordance with this example, the sine bar plates 100 and 102 are formed of aluminum stock having a width of just less than ½ of an inch, a height of 1 ¼° inches, a length of 8 ¼ inches, the hinge members including cylindrical openings of ¼ of an inch, and plate 100 including 2 spaced openings for receiving threaded fasteners or set screws for attaching the plate 100 to the protractor head 18. The threaded rod 128 is an elongate number 10-32 threaded rod.

EXAMPLE 1

In accordance with one example of the present invention, the miter device is shipped from the factory set for 0° 0 minutes, with the angle mark 74 on the protractor head set for 0°, the step angle hole lock shoulder bolt 54 in the 0° offset hole 76, the locking screw 154 snug but not tight, and the thimble screw rod 128 loose (not in contact with the shaft 126 of bolt 124).

In accordance with the same example of the present invention, the setup instructions are as follows:

I. Do not change the position of the angle hole lock shoulder bolt.

II. Do not loosen the locking screw.

III. Rotate the thimble screw in a clockwise direction until it makes contact with the sine bar. Do not apply pressure to the thimble screw, just make contact.

IV. The reference guide line should be in line with the 0 minute line on the thimble screw. If this condition does not exist:

A. Loosen the nut on the end of the thimble screw.

B. Hold the screw with a screw driver.

C. Turn the thimble screw so the lines line up.

D. Tighten the nut to lock in the new thimble screw position.

EXAMPLE 2

I. To set the miter device for 30° 0 minutes miter angle:

A. Loosen the pivot point lock shoulder bolt 56 by one full revolution.

B. Loosen and remove the step angle hole lock shoulder bolt 54.

C. Rotate the protractor head 18 until the 30° angle mark 74 is centered on the base line 72.

D. Replace and tighten the step angle hole lock shoulder bolt 54.

E. Tighten the pivot point lock shoulder bolt 56.

F. Loosen the locking screw 154.

G. Rotate the thimble screw 128 counterclockwise until it is no longer in contact with the shaft 126 of bolt 124 when the sine bar is fully closed.

H. Tighten (use very slight pressure only) the locking screw 156.

EXAMPLE 3

II. To set the miter device for 37 ½° (37 degrees 30 minutes), clockwise rotation:

A. Loosen the pivot point lock shoulder bolt 56 by one full revolution.

B. Loosen and remove the step angle hole lock shoulder bolt 54.

C. Rotate the protractor head 18 clockwise until the 37.5° angle mark is centered on the base line 72.

D. Replace and tighten the angle hole lock shoulder bolt 54.

E. Tighten the pivot point lock shoulder bolt 56.

F. Loosen the locking screw 154.

G. Rotate the thimble 134 counterclockwise until the rod 128 is no longer in contact with the shaft 126 when the sine bar is fully closed.

H. Tighten (use very slight pressure only) the locking screw 154.

EXAMPLE 4

III. To set the miter for 37 ½° (37 degrees 30 minutes) counterclockwise rotation:

A. Loosen the pivot point lock shoulder bolt 56 by one full revolution.

B. Loosen and remove the angle hole lock shoulder bolt 54.

C. Rotate the protractor head counterclockwise until the 37 ½° angle mark is centered on the base line 72.

D. Replace and tighten the angle hole lock shoulder bolt 54.

E. Tighten the pivot point lock shoulder bolt 56.

F. Loosen the locking screw 154.

G. Rotate the thimble screw counterclockwise until it is no longer in contact with the shaft 126 when the sine bar is fully closed.

H. Tighten (use very slight pressure only) the locking screw 154.

EXAMPLE 5

IV. To set the miter gauge for 41 degrees 47 minutes (41° 47'), clockwise rotation:

A. Loosen the pivot point lock shoulder bolt 56 by one full revolution.

B. Loosen and remove the angle hole lock shoulder bolt 54.

C. Rotate the protractor head clockwise until the 37.5 degree angle mark is centered on the base line 72.

D. Replace and tighten the angle hole lock shoulder bolt 54.

E. Tighten the pivot point lock shoulder bolt 56.

F. Loosen the locking screw 154.

G. Rotate the thimble screw 128 counterclockwise until it is no longer in contact with the shaft 126 when the sine bar is fully closed.

H. Tighten (very slight pressure only) the locking screw 154.

I. Rotate the thimble screw 128 clockwise until it contacts the shaft 126.

J. Loosen the locking screw 154 and back it away from the closed position.

K. Rotate the thimble 134 clockwise 17 complete revolutions (this adds 4° 15 minutes to the sine bar). Now rotate the thimble 134 two divisions (this adds two minutes to the sine bar). The total is 37 degrees 30 minutes +4 degrees 17 minutes=41 degrees 47 minutes clockwise.

L. Tighten (very slight pressure only) the locking screw 154.

EXAMPLE 6

V. To set the miter 10 for 33 degrees 13 minutes, counterclockwise rotation using the 7 ½° offset hole 80:

A. Loosen the pivot point lock shoulder bolt 56 by one full revolution.

B. Loosen and remove the angle hole lock shoulder bolt 54.

C. Rotate the protractor head 18 counterclockwise until the 37 ½° angle mark 74 is centered on the base line 72.

D. Replace and tighten the angle hole lock shoulder bolt 54.

E. Tighten the pivot point lock shoulder bolt 56.

F. Loosen the locking screw 154.

G. Rotate the thimble screw counterclockwise until the rod 128 is no longer in contact with the shaft 126 when the sine bar is fully closed.

H. Tighten (very slight pressure only) the locking screw 154.

I. Rotate the thimble 134 clockwise until the rod 128 contacts the shaft 126.

J. Loosen the locking screw 154 and back it away from the closed position.

K. Rotate the thimble 134 clockwise 17 complete revolutions (this adds 4 degrees 15 minutes to the sine bar). Now rotate the thimble 134 two divisions (this adds two minutes to the sine bar). The total is 37 degrees 30 minutes−4 degrees 17 minutes=33 degrees 13 minutes counterclockwise.

L. Tighten (very slight pressure only) the locking screw.

ERROR CALCULATIONS

Machining error:

Pinned (angle step-holes) holes

In the protractor: ±0.0002 inch In the guide bar: +0.0002 inch

Total error of protractor=Arc sine (0.0004/3.75)=±0 degrees 0 minutes 22.00 seconds Sine bar theoretical error: ±0 degrees 0 minutes 19.55 seconds (See Table V)

Sine bar Machining error: ±0.0002

Machining error of sine bar=Arc sine (0.0002/7.1773)=±0 degrees 0 minutes 5.75 seconds Total sine bar error=±0 degrees 0 minutes 25.30 seconds Total worst condition error=±0 degrees 0 minutes 47.30 seconds This error translates to 0.002 inches of error in a 10 inch miter cut.

Table I shows a particular example of a coloration of the gradation lines 150 on thimble 134 which facilitate the differentiation by the user of the different gradation lines each corresponding to one minute or 1/60 of a degree. The coloration can be used in place of line numbers or as an adjunct thereto.

Tables II and III show the degree, minute and second conversions for angles encountered in standard pitch angles for house trusses. As may be seen from the table the only standard truss angle found on the miter gages currently marketed is at 12—12 (45 degrees). Table III is a continuation of Table II.

Table IV shows the miter angle settings for constructing a frame having a selected number of sides.

Table V provides theoretical error calculations using a number 10-32 UCNF screw as the thimble screw or threaded rod 128.

TABLE I

●●●●0 (BLACK)
●●●●1 (GREEN)
●●●●2 (ORANGE)
●●●●3 (PURPLE)
●●●●4 (YELLOW)
●●●●5 (BLUE)
●●●●6 (GREEN)
●●●●7 (ORANGE)
●●●●8 (PURPLE)
●●●●9 (YELLOW)
●●●●10 (RED)
●●●●11 (GREEN)
●●●●12 (ORANGE)
●●●●13 (PURPLE)
●●●●14 (YELLOW)
●●●●0 (BLACK)

TABLE II

| HEIGHT | WIDTH | HYP | ANGLE DEG | MIN | SEC |
|---|---|---|---|---|---|
| 1.00 | 12 | 12.0416 | 4 | 45 | 49 |
| 1.25 | 12 | 12.0649 | 5 | 56 | 48 |
| 1.50 | 12 | 12.0934 | 7 | 7 | 30 |
| 1.75 | 12 | 12.1269 | 8 | 17 | 49 |
| 2.00 | 12 | 12.1655 | 9 | 27 | 44 |
| 2.25 | 12 | 12.2091 | 10 | 37 | 10 |
| 2.50 | 12 | 12.2577 | 11 | 46 | 5 |
| 2.75 | 12 | 12.3111 | 12 | 54 | 26 |
| 3.00 | 12 | 12.3693 | 14 | 2 | 10 |
| 3.25 | 12 | 12.4323 | 15 | 9 | 14 |
| 3.50 | 12 | 12.5000 | 16 | 15 | 36 |
| 3.75 | 12 | 12.5723 | 17 | 21 | 14 |
| 4.00 | 12 | 12.6491 | 18 | 26 | 5 |
| 4.25 | 12 | 12.7304 | 19 | 30 | 8 |

TABLE II-continued

| HEIGHT | WIDTH | HYP | ANGLE DEG | MIN | SEC |
|---|---|---|---|---|---|
| 4.50 | 12 | 12.8160 | 20 | 33 | 21 |
| 4.75 | 12 | 12.9059 | 21 | 35 | 43 |
| 5.00 | 12 | 13.0000 | 22 | 37 | 11 |
| 5.25 | 12 | 13.0982 | 23 | 37 | 45 |
| 5.50 | 12 | 13.2004 | 24 | 37 | 24 |
| 5.75 | 12 | 13.3065 | 25 | 36 | 7 |
| 6.00 | 12 | 13.4164 | 26 | 33 | 54 |
| 6.25 | 12 | 13.5301 | 27 | 30 | 43 |
| 6.50 | 12 | 13.6473 | 28 | 26 | 34 |
| 6.75 | 12 | 13.7682 | 29 | 21 | 27 |
| 7.00 | 12 | 13.8924 | 30 | 15 | 23 |
| 7.25 | 12 | 14.0201 | 31 | 8 | 20 |
| 7.50 | 12 | 14.1510 | 32 | 0 | 19 |
| 7.75 | 12 | 14.2850 | 32 | 51 | 20 |
| 8.00 | 12 | 14.4222 | 33 | 41 | 24 |
| 8.25 | 12 | 14.5624 | 34 | 30 | 30 |
| 8.50 | 12 | 14.7054 | 35 | 18 | 40 |
| 8.75 | 12 | 14.8513 | 36 | 5 | 53 |
| 9.00 | 12 | 15.0000 | 36 | 52 | 11 |
| 9.25 | 12 | 15.1513 | 37 | 37 | 34 |
| 9.50 | 12 | 15.3052 | 38 | 22 | 2 |
| 9.75 | 12 | 15.4616 | 39 | 5 | 37 |
| 10.00 | 12 | 15.6205 | 39 | 48 | 20 |
| 10.25 | 12 | 15.7817 | 40 | 30 | 10 |
| 10.50 | 12 | 15.9452 | 41 | 11 | 9 |
| 10.75 | 12 | 16.1109 | 41 | 51 | 18 |
| 11.00 | 12 | 16.2788 | 42 | 30 | 37 |
| 11.25 | 12 | 16.4488 | 43 | 9 | 8 |
| 11.50 | 12 | 16.6208 | 43 | 46 | 52 |
| 11.75 | 12 | 16.7947 | 44 | 23 | 48 |
| 12.00 | 12 | 16.9706 | 45 | 0 | 0 |

TABLE III

| | | | SET MITER ANGLE | | |
|---|---|---|---|---|---|
| WIDTH | HEIGHT | HYP | DEG | MIN | SEC |
| 1.00 | 12 | 12.0416 | 85 | 14 | 10 |
| 1.25 | 12 | 12.0649 | 84 | 3 | 11 |
| 1.50 | 12 | 12.0934 | 82 | 52 | 29 |
| 1.75 | 12 | 12.1269 | 81 | 42 | 10 |
| 2.00 | 12 | 12.1655 | 80 | 32 | 15 |
| 2.25 | 12 | 12.2091 | 79 | 22 | 49 |
| 2.50 | 12 | 12.2577 | 78 | 13 | 54 |
| 2.75 | 12 | 12.3111 | 77 | 5 | 33 |
| 3.00 | 12 | 12.3693 | 75 | 57 | 49 |
| 3.25 | 12 | 12.4323 | 74 | 50 | 45 |
| 3.50 | 12 | 12.5000 | 73 | 44 | 23 |
| 3.75 | 12 | 12.5723 | 72 | 38 | 45 |
| 4.00 | 12 | 12.6491 | 71 | 33 | 54 |
| 4.25 | 12 | 12.7304 | 70 | 29 | 51 |
| 4.50 | 12 | 12.8160 | 69 | 26 | 38 |
| 4.75 | 12 | 12.9059 | 68 | 24 | 16 |
| 5.00 | 12 | 13.0000 | 67 | 22 | 48 |
| 5.25 | 12 | 13.0982 | 66 | 22 | 14 |
| 5.50 | 12 | 13.2004 | 65 | 22 | 35 |
| 5.75 | 12 | 13.3065 | 64 | 23 | 52 |
| 6.00 | 12 | 13.4164 | 63 | 26 | 5 |
| 6.25 | 12 | 13.5301 | 62 | 29 | 16 |
| 6.50 | 12 | 13.6473 | 61 | 33 | 25 |
| 6.75 | 12 | 13.7682 | 60 | 38 | 32 |
| 7.00 | 12 | 13.8924 | 59 | 44 | 36 |
| 7.25 | 12 | 14.0201 | 58 | 51 | 39 |
| 7.50 | 12 | 14.1510 | 57 | 59 | 40 |
| 7.75 | 12 | 14.2850 | 57 | 8 | 39 |
| 8.00 | 12 | 14.4222 | 56 | 18 | 35 |
| 8.25 | 12 | 14.5624 | 55 | 29 | 29 |
| 8.50 | 12 | 14.7054 | 54 | 41 | 19 |
| 8.75 | 12 | 14.8513 | 53 | 54 | 6 |
| 9.00 | 12 | 15.0000 | 53 | 7 | 48 |
| 9.25 | 12 | 15.1513 | 52 | 22 | 25 |
| 9.50 | 12 | 15.3052 | 51 | 37 | 57 |

TABLE III-continued

| WIDTH | HEIGHT | HYP | SET MITER ANGLE DEG | MIN | SEC |
|---|---|---|---|---|---|
| 9.75 | 12 | 15.4616 | 50 | 54 | 22 |
| 10.00 | 12 | 15.6205 | 50 | 11 | 39 |
| 10.25 | 12 | 15.7817 | 49 | 29 | 49 |
| 10.50 | 12 | 15.9452 | 48 | 48 | 50 |
| 10.75 | 12 | 16.1109 | 48 | 8 | 41 |
| 11.00 | 12 | 16.2788 | 47 | 29 | 22 |
| 11.25 | 12 | 16.4488 | 46 | 50 | 51 |
| 11.50 | 12 | 16.6208 | 46 | 13 | 7 |
| 11.75 | 12 | 16.7947 | 45 | 36 | 11 |
| 12.00 | 12 | 16.9706 | 45 | 0 | 0 |

TABLE IV

| NUMBER OF SIDES | SET MITER ANGLE DEG | MIN | SEC |
|---|---|---|---|
| 3 | 60 | 0 | 0 |
| 4 | 45 | 0 | 0 |
| 5 | 36 | 0 | 0 |
| 6 | 30 | 0 | 0 |
| 7 | 25 | 42 | 51 |
| 8 | 22 | 30 | 0 |
| 9 | 20 | 0 | 0 |
| 10 | 18 | 0 | 0 |
| 11 | 16 | 21 | 49 |
| 12 | 15 | 0 | 0 |
| 13 | 13 | 50 | 46 |
| 14 | 12 | 51 | 25 |
| 15 | 12 | 0 | 0 |

TABLE IV-continued

| NUMBER OF SIDES | SET MITER ANGLE DEG | MIN | SEC |
|---|---|---|---|
| 16 | 11 | 15 | 0 |
| 17 | 10 | 35 | 17 |
| 18 | 10 | 0 | 0 |
| 19 | 9 | 28 | 25 |
| 20 | 9 | 0 | 0 |
| 21 | 8 | 34 | 17 |
| 22 | 8 | 10 | 54 |
| 23 | 7 | 49 | 33 |
| 24 | 7 | 30 | 0 |
| 25 | 7 | 12 | 0 |
| 26 | 6 | 55 | 23 |
| 27 | 6 | 40 | 0 |
| 28 | 6 | 25 | 42 |
| 29 | 6 | 12 | 24 |
| 30 | 6 | 0 | 0 |
| 31 | 5 | 48 | 23 |
| 32 | 5 | 37 | 29 |
| 33 | 5 | 27 | 16 |
| 34 | 5 | 17 | 38 |
| 35 | 5 | 8 | 34 |
| 36 | 5 | 0 | 0 |
| 37 | 4 | 51 | 53 |
| 38 | 4 | 44 | 12 |
| 39 | 4 | 36 | 55 |
| 40 | 4 | 30 | 0 |
| 41 | 4 | 23 | 24 |
| 42 | 4 | 17 | 8 |
| 43 | 4 | 11 | 9 |
| 44 | 4 | 5 | 27 |
| 45 | 4 | 0 | 0 |

TABLE V

ERROR CALCULATIONS
BASED ON #10–32 UCNF SCREW - 15 DIVISIONS PER REVOLUTION
HYP = 7.1773 INCHES

| TOTAL DIVISIONS | REV | DIAL SETTING | RADIANS | DEGREE | MINUTE | SECOND | ERROR IN SECONDS |
|---|---|---|---|---|---|---|---|
| 1 | 0 | 1 | 0.016631 | 0 | 0 | 59.87186 | 0.128132 |
| 2 | 0 | 2 | 0.033262 | 0 | 1 | 59.74373 | 0.256260 |
| 3 | 0 | 3 | 0.049893 | 0 | 2 | 59.61562 | 0.384378 |
| 4 | 0 | 4 | 0.066524 | 0 | 3 | 59.48751 | 0.512480 |
| 5 | 0 | 5 | 0.083155 | 0 | 4 | 59.35943 | 0.640563 |
| 6 | 0 | 6 | 0.099786 | 0 | 5 | 59.23137 | 0.768620 |
| 7 | 0 | 7 | 0.116417 | 0 | 6 | 59.10335 | 0.896647 |
| 8 | 0 | 8 | 0.133048 | 0 | 7 | 58.97536 | 1.024638 |
| 9 | 0 | 9 | 0.149679 | 0 | 8 | 58.84741 | 1.152589 |
| 10 | 0 | 10 | 0.166310 | 0 | 9 | 58.71950 | 1.280495 |
| 11 | 0 | 11 | 0.182942 | 0 | 10 | 58.59164 | 1.408351 |
| 12 | 0 | 12 | 0.199573 | 0 | 11 | 58.46384 | 1.536150 |
| 13 | 0 | 13 | 0.216204 | 0 | 12 | 58.33610 | 1.663890 |
| 14 | 0 | 14 | 0.232835 | 0 | 13 | 58.20843 | 1.791564 |
| 15 | 1 | 0 | 0.249466 | 0 | 14 | 58.08083 | 1.919167 |
| 16 | 1 | 1 | 0.266098 | 0 | 15 | 57.95330 | 2.046694 |
| 17 | 1 | 2 | 0.282729 | 0 | 16 | 57.82585 | 2.174141 |
| 18 | 1 | 3 | 0.299360 | 0 | 17 | 57.69849 | 2.301502 |
| 19 | 1 | 4 | 0.315992 | 0 | 18 | 57.57122 | 2.428772 |
| 20 | 1 | 5 | 0.332623 | 0 | 19 | 57.44405 | 2.555946 |
| 21 | 1 | 6 | 0.349254 | 0 | 20 | 57.31697 | 2.683020 |
| 22 | 1 | 7 | 0.365886 | 0 | 21 | 57.19001 | 2.809987 |
| 23 | 1 | 8 | 0.382517 | 0 | 22 | 57.06315 | 2.936844 |
| 24 | 1 | 9 | 0.399149 | 0 | 23 | 56.93641 | 3.063584 |
| 25 | 1 | 10 | 0.415780 | 0 | 24 | 56.80979 | 3.190204 |
| 26 | 1 | 11 | 0.432412 | 0 | 25 | 56.68330 | 3.316697 |
| 27 | 1 | 12 | 0.449043 | 0 | 26 | 56.55694 | 3.443059 |
| 28 | 1 | 13 | 0.465675 | 0 | 27 | 56.43071 | 3.569285 |

TABLE V-continued

ERROR CALCULATIONS
BASED ON #10–32 UCNF SCREW - 15 DIVISIONS PER REVOLUTION
HYP = 7.1773 INCHES

| TOTAL DIVISIONS | REV | DIAL SETTING | RADIANS | DEGREE | MINUTE | SECOND | ERROR IN SECONDS |
|---|---|---|---|---|---|---|---|
| 29 | 1 | 14 | 0.482306 | 0 | 28 | 56.30462 | 3.695370 |
| 30 | 2 | 0 | 0.498938 | 0 | 29 | 56.17869 | 3.821308 |
| 31 | 2 | 1 | 0.515570 | 0 | 30 | 56.05290 | 3.947095 |
| 32 | 2 | 2 | 0.532202 | 0 | 31 | 55.92727 | 4.072726 |
| 33 | 2 | 3 | 0.548833 | 0 | 32 | 55.80180 | 4.198195 |
| 34 | 2 | 4 | 0.565465 | 0 | 33 | 55.67650 | 4.323497 |
| 35 | 2 | 5 | 0.582097 | 0 | 34 | 55.55137 | 4.448628 |
| 36 | 2 | 6 | 0.598729 | 0 | 35 | 55.42641 | 4.573583 |
| 37 | 2 | 7 | 0.615361 | 0 | 36 | 55.30164 | 4.698356 |
| 38 | 2 | 8 | 0.631993 | 0 | 37 | 55.17705 | 4.822942 |
| 39 | 2 | 9 | 0.648625 | 0 | 38 | 55.05266 | 4.947337 |
| 40 | 2 | 10 | 0.665257 | 0 | 39 | 54.92846 | 5.071534 |
| 41 | 2 | 11 | 0.681890 | 0 | 40 | 54.80446 | 5.195530 |
| 42 | 2 | 12 | 0.698522 | 0 | 41 | 54.68068 | 5.319319 |
| 43 | 2 | 13 | 0.715154 | 0 | 42 | 54.55710 | 5.442896 |
| 44 | 2 | 14 | 0.731787 | 0 | 43 | 54.43374 | 5.566256 |
| 45 | 3 | 0 | 0.748419 | 0 | 44 | 54.31060 | 5.689395 |
| 208 | 13 | 13 | 3.461368 | 3 | 27 | 40.92647 | 19.07352 |
| 209 | 13 | 14 | 3.478030 | 3 | 28 | 40.90828 | 19.09171 |
| 210 | 14 | 0 | 3.494691 | 3 | 29 | 40.89116 | 19.10883 |
| 211 | 14 | 1 | 3.511354 | 3 | 30 | 40.87510 | 19.12489 |
| 212 | 14 | 2 | 3.528016 | 3 | 31 | 40.86012 | 19.13987 |
| 213 | 14 | 3 | 3.544679 | 3 | 32 | 40.84620 | 19.15379 |
| 214 | 14 | 4 | 3.561342 | 3 | 33 | 40.83337 | 19.16662 |
| 215 | 14 | 5 | 3.578006 | 3 | 34 | 40.82163 | 19.17836 |
| 216 | 14 | 6 | 3.594669 | 3 | 35 | 40.81097 | 19.18902 |
| 217 | 14 | 7 | 3.611333 | 3 | 36 | 40.80141 | 19.19858 |
| 218 | 14 | 8 | 3.627998 | 3 | 37 | 40.79296 | 19.20703 |
| 219 | 14 | 9 | 3.644662 | 3 | 38 | 40.78561 | 19.21438 |
| 220 | 14 | 10 | 3.661327 | 3 | 39 | 40.77937 | 19.22062 |
| 221 | 14 | 11 | 3.677992 | 3 | 40 | 40.77424 | 19.22575 |
| 222 | 14 | 12 | 3.694658 | 3 | 41 | 40.77024 | 19.22975 |
| 223 | 14 | 13 | 3.711324 | 3 | 42 | 40.76737 | 19.23262 |
| 224 | 14 | 14 | 3.727990 | 3 | 43 | 40.76563 | 19.23436 |
| 225 | 15 | 0 | 3.744656 | 3 | 44 | 40.76502 | 19.23497 |
| 226 | 15 | 1 | 3.761323 | 3 | 45 | 40.76556 | 19.23443 |
| 227 | 15 | 2 | 3.777990 | 3 | 46 | 40.76724 | 19.23275 |
| 228 | 15 | 3 | 3.794658 | 3 | 47 | 40.77008 | 19.22991 |
| 229 | 15 | 4 | 3.811326 | 3 | 48 | 40.77407 | 19.22592 |
| 230 | 15 | 5 | 3.827994 | 3 | 49 | 40.77923 | 19.22076 |
| 231 | 15 | 6 | 3.844662 | 3 | 50 | 40.78556 | 19.21443 |
| 232 | 15 | 7 | 3.861331 | 3 | 51 | 40.79306 | 19.20693 |
| 233 | 15 | 8 | 3.878000 | 3 | 52 | 40.80173 | 19.19826 |
| 234 | 15 | 9 | 3.894669 | 3 | 53 | 40.81160 | 19.18839 |
| 235 | 15 | 10 | 3.911339 | 3 | 54 | 40.82265 | 19.17734 |
| 236 | 15 | 11 | 3.928009 | 3 | 55 | 40.83489 | 19.16510 |
| 237 | 15 | 12 | 3.944680 | 3 | 56 | 40.84833 | 19.15166 |
| 238 | 15 | 13 | 3.961350 | 3 | 57 | 40.86298 | 19.13701 |
| 239 | 15 | 14 | 3.978021 | 3 | 58 | 40.87883 | 19.12116 |
| 240 | 16 | 0 | 3.994693 | 3 | 59 | 40.89590 | 19.10409 |
| 241 | 16 | 1 | 4.011365 | 4 | 0 | 40.91419 | 19.08580 |
| 242 | 16 | 2 | 4.028037 | 4 | 1 | 40.93371 | 19.06628 |
| 243 | 16 | 3 | 4.044709 | 4 | 2 | 40.95445 | 19.04554 |
| 244 | 16 | 4 | 4.061382 | 4 | 3 | 40.97643 | 19.02356 |
| 245 | 16 | 5 | 4.078055 | 4 | 4 | 40.99965 | 19.00034 |
| 246 | 16 | 6 | 4.094728 | 4 | 5 | 41.02411 | 18.97588 |
| 247 | 16 | 7 | 4.111402 | 4 | 6 | 41.04983 | 18.95016 |
| 248 | 16 | 8 | 4.128076 | 4 | 7 | 41.07680 | 18.92319 |
| 249 | 16 | 9 | 4.144751 | 4 | 8 | 41.10503 | 18.89496 |
| 250 | 16 | 10 | 4.161426 | 4 | 9 | 41.13453 | 18.86546 |
| 251 | 16 | 11 | 4.178101 | 4 | 10 | 41.16530 | 18.83469 |
| 252 | 16 | 12 | 4.194777 | 4 | 11 | 41.19734 | 18.80265 |
| 253 | 16 | 13 | 4.211452 | 4 | 12 | 41.23067 | 18.76932 |
| 254 | 16 | 14 | 4.228129 | 4 | 13 | 41.26528 | 18.73471 |
| 255 | 17 | 0 | 4.244805 | 4 | 14 | 41.30119 | 18.69880 |
| 256 | 17 | 1 | 4.261482 | 4 | 15 | 41.33839 | 18.66160 |
| 257 | 17 | 2 | 4.278160 | 4 | 16 | 41.37689 | 18.62310 |
| 258 | 17 | 3 | 4.294837 | 4 | 17 | 41.41670 | 18.58329 |
| 259 | 17 | 4 | 4.311516 | 4 | 18 | 41.45783 | 18.54216 |
| 260 | 17 | 5 | 4.328194 | 4 | 19 | 41.50027 | 18.49972 |
| 261 | 17 | 6 | 4.344873 | 4 | 20 | 41.54404 | 18.45595 |

Figure 7:
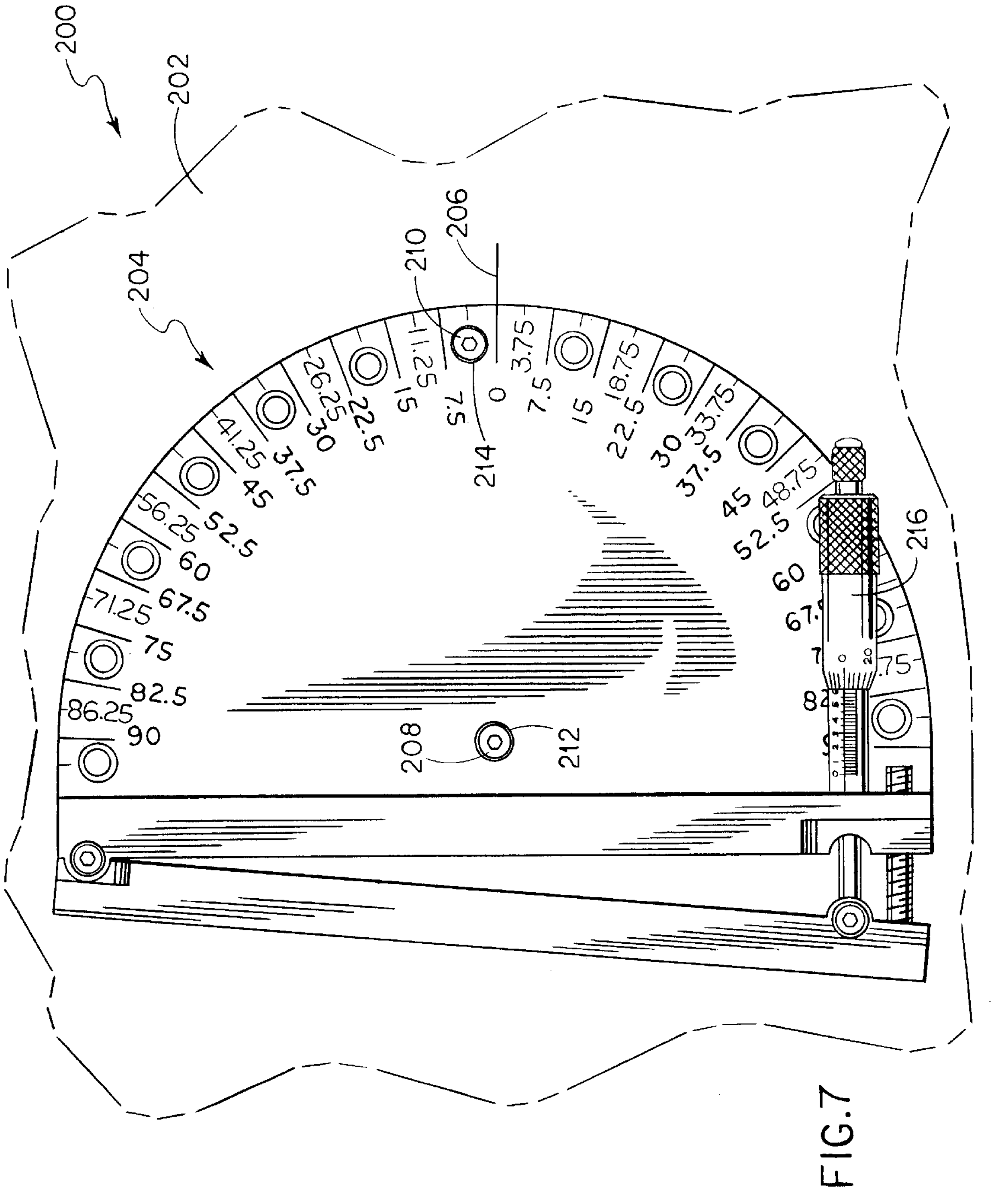
FIG. 7 is a top view representation of an improved miter device in accordance with another embodiment of the present invention.

In accordance with another embodiment of the present invention as shown in FIG. 7 of the drawings, a miter device, jig or apparatus 200 includes a large planar element or surface 202 and a protractor and sine bar unit 204. The planar surface 202 includes one or more base lines or center lines 206, one or more pivot point openings, and one or more sets of offset openings like those in the guide bar 16. The planar surface 202 may be fixed relative to a particular saw, punch, drill or other machine or tool or may be movable for sliding or rotary movement relative to the machine. The protractor and sine bar unit 204 is used in the same fashion as the protractor and sine bar 12 and 14 of the miter device 10 and include respective pivot point and step angle locking bolts 208 and 210, a plurality of step angle holes 214, and a pivot point hole 212. The sine bar of the sine bar and protractor unit 204 differs from the sine bar 14 of the miter device 10 in that the graduated thumb screw or thimble unit 122 has been replaced with a conventional micrometer barrel 216.

Figure 8:
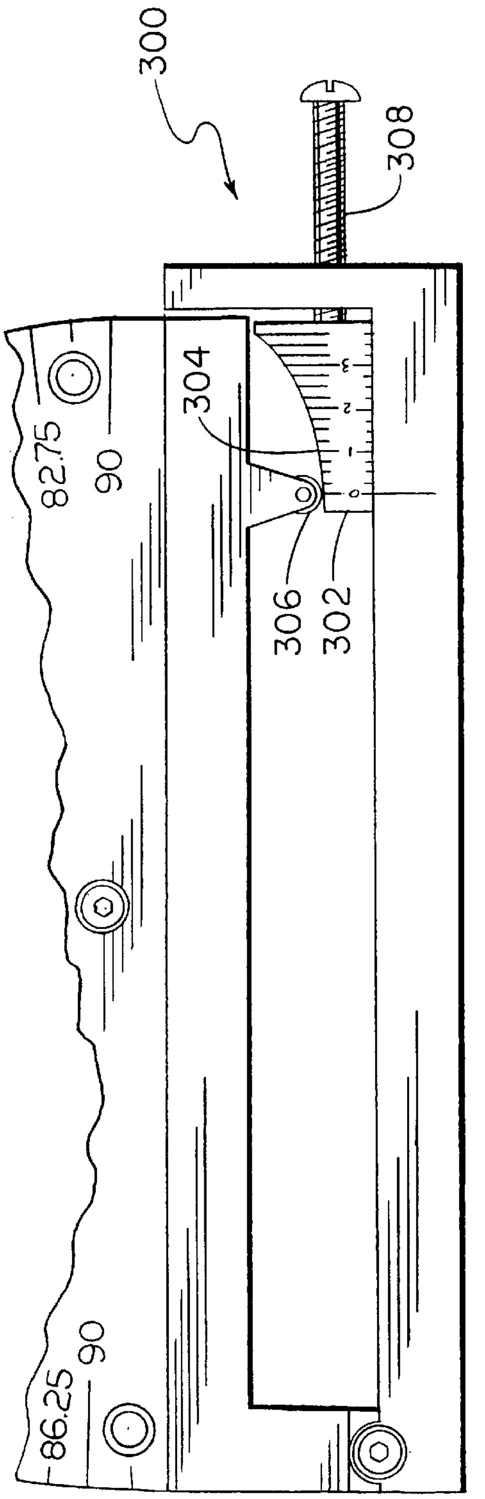
FIG. 8 is a fragmentary top view illustration of an alternative embodiment of the sine bar in accordance with the present invention.
Figure 9:
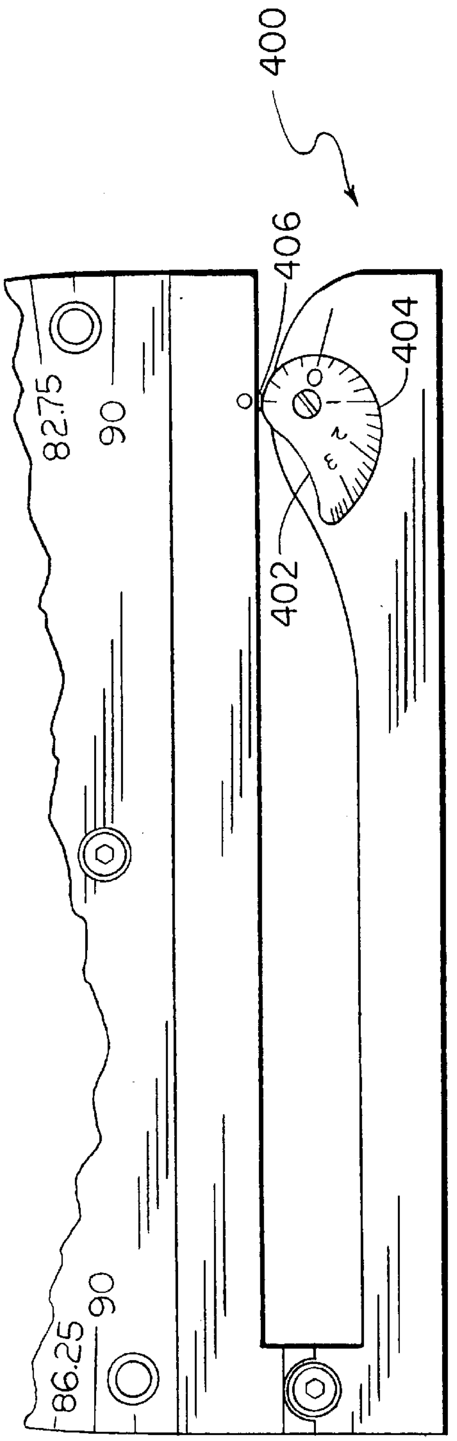
FIG. 9 is a fragmentary top view representation of still another embodiment of the sine bar in accordance with the present invention.

FIGS. 8 and 9 show alternative sine bar arrangements 300 and 400 respectively where the error inherent in converting a trigonometric sine function to a linear function is eliminated. The sine bar 300 incorporates a sine wedge 302 having a sine surface 304 which contacts a roller 306. The wedge 302 is moved by rotating the threaded member 308.

With reference to FIG. 9 of the drawings, a sine cam 402 is mounted for rotation about a vertical axis on the front sine plate and has a sine surface 404 which contacts a vertical roller 406. Using a sine wedge, sine cam, or adding additional angle step-holes can eliminate the error caused by the use of a linear element and further enhance the accuracy and precision of the miter device and method of the present invention.

Thus it will be appreciated that as a result of the present invention, a highly effective, improved miter device and method is provided by which the principal objective, among others, is completely fulfilled. It is contemplated, and will be apparent to those skilled in the art from the preceding description and accompanying drawings, that modifications and/or changes may be made in the illustrated embodiments without departure from the present invention. For example, an additional step-hole can be added between each of the step-holes 214 of the miter 200 of FIG. 7. Accordingly, it is expressly intended that the foregoing description and accompanying drawings are illustrative of preferred embodiments only, not limiting, and that the true spirit and scope of the present invention be determined by reference to the appended claims.

What is claimed is:

1. A miter apparatus for making precision cuts, comprising:

a protractor including a head having a curved rearward surface subtending an arc, a planar forward surface, a plurality of precision angle step-holes spaced apart at equal angle increments along at least a portion of said curved rearward surface, a pivot point hole located at the center of the arc of said rearward surface, and respective locking means adapted to be received in said pivot point hole and at least one of said angle step-holes to fix the position of said protractor in relation to at least one of an elongate guide bar and a planar surface, and a sine bar attached to said planar forward surface of said protractor for adjusting the angle of cut between the angles of said step-holes and serving as a working surface.

2. The miter apparatus of claim 1, wherein said plurality of precision angle step-holes are spaced apart at 15°.

3. The miter apparatus of claim 2, wherein said curved rearward surface subtends an arc of at least 180°.

4. The miter apparatus of claim 3, wherein said head includes at least 13 angle step-holes.

5. The miter apparatus of claim 1, wherein said sine bar includes two vertical plates attached at one end by a vertical hinge pin and having at the other end an angle adjustment means.

6. The miter apparatus of claim 5, wherein said sine bar angle adjustment means includes a micrometer.

7. The miter apparatus of claim 5, wherein said sine bar angle adjustment means includes a graduated thumb screw.

8. The miter apparatus of claim 7, wherein said thumb screw is graduated at 1/60° (1 minute) increments and one full revolution of the thumb screw will change the angle of the sine bar by ¼° (15 minutes).

9. The miter apparatus of claim 5, wherein said sine bar angle adjustment means includes a sine function wedge.

10. The miter apparatus of claim 5, wherein said sine bar angle adjustment means includes a sine function cam.

11. The miter apparatus of claim 5, wherein said sine bar angle adjustment means includes a locking screw to lock the sine bar once it has been set.

12. The miter apparatus of claim 1, further comprising the elongate guide bar attached to said protractor by said locking means.

13. The miter apparatus of claim 12, wherein said guide bar includes at least a pivot point opening, a 0° offset opening and at least one other offset degree opening.

14. The miter apparatus of claim 13, wherein said guide bar includes at least one of 7 ½° and 3 ¾° offset openings.

15. The miter apparatus of claim 14, wherein said locking means includes respective pivot point and angle hole lock shoulder bolts, said pivot point lock shoulder bolt serves as the pivot point for the protractor head, when said angle hole lock shoulder bolt is placed in the 0° offset opening, the protractor head is set at an increment of 15°, and when said angle hole lock shoulder bolt is placed in the 7 ½° or 3 ¾° offset opening, the protractor head is set at a 7 ½° or 3 ¾° offset from a 15° angle.

16. The miter apparatus of claim 1, wherein said locking means includes respective pivot point and angle hole lock shoulder bolts.

17. The miter apparatus of claim 1, further comprising the planar surface having said protractor attached thereto by said locking means.

18. The miter apparatus of claim 17, wherein said surface includes at least a pivot point opening, a 0° offset opening and at least one other offset degree opening.

19. A method of making a precision cut on a table saw, jigsaw, band saw, or the like using a miter apparatus for making precision cuts including a protractor including a head having a curved rearward surface subtending an arc a planar forward surface, a plurality of precision angle step-holes spaced apart at equal angle increments along at least a portion of said curved rearward surface, a pivot point hole located at the center of the arc of said rearward surface, and respective locking means adapted to be received in said pivot point hole and at least one of said angle step-holes to fix the position of said protractor in relation to at least one of an elongate guide bar and a planar surface, and a sine bar attached to said planar forward surface of said protractor for adjusting the angle of cut between the angles of said step-holes and serving as a working surface, comprising the steps of:

setting the angular position of said protractor head and sine bar in relation to at least one of said guide bar and said planar surface, and positioning a workpiece against said sine bar.

20. A miter apparatus for making precision cuts, comprising:

a protractor including a head having a curved rearward surface subtending an arc, a planar forward surface, a plurality of precision angle step-holes spaced apart at equal angle increments along at least a portion of said curved rearward surface, a pivot point hole located at the center of the arc of said rearward surface, and respective locking means including pivot point and angle hole lock shoulder bolts adapted to be received in said pivot point hole and at least one of said angle step-holes to fix the position of said protractor, wherein said plurality of precision angle step-holes are spaced apart at 15°, said curved rearward surface subtends an arc of at least 180°, and said head includes at least 13 angle step-holes, a sine bar attached to said planar forward surface of said protractor for adjusting the angle of cut between the angles of said step-holes and serving as a working surface, wherein said sine bar includes two vertical plates attached at one end by a vertical hinge pin and having at the other end an angle adjustment means including a graduated thumb screw graduated at 1/60° (1 minute) increments with one full revolution of the thumb screw changing the angle of the sine bar by ¼° (15 minutes) and a locking screw to lock the sine bar once it has been set, and an elongate guide bar adapted to be attached to said protractor by said locking means, wherein said guide bar includes at least a pivot point opening, a 0° offset opening and at least one of 7 ½° and 3 ¾° offset openings, wherein said pivot point lock shoulder bolt serves as the pivot point for the protractor head, when said angle hole lock shoulder bolt is placed in the 0° offset opening, the protractor head is set at an increment of 15°, and when said angle hole lock shoulder bolt is placed in the 7 ½° or 3 ¾° offset opening, the protractor head is set at a 7 ½° or 3 ¾° offset from a 15° angle.

* * * * *